United States Patent [19]

Asano et al.

[11] 4,235,769

[45] Nov. 25, 1980

[54] COLOR-DEVELOPING PHENOLIC-ALDEHYDE COMPOSITION FOR PRESSURE-SENSITIVE RECORDING SHEET MATERIAL AND PROCESS FOR THE PREPARATION THEREOF

[75] Inventors: Makoto Asano; Saburo Kawashima; Kenichi Sugimoto; Tadashi Kobayashi, all of Yokohama, Japan

[73] Assignee: Mitsui Toatsu Chemicals, Inc., Tokyo, Japan

[21] Appl. No.: 4,770

[22] Filed: Jan. 19, 1979

[30] Foreign Application Priority Data

Jan. 26, 1978 [JP] Japan .................................. 53-6734

[51] Int. Cl.$^3$ ...................... C08G 8/12; C08G 8/24; C08G 8/28; C08K 5/13
[52] U.S. Cl. ......................... 260/45.8 NT; 260/30.2; 260/30.8 R; 260/45.7 PH; 525/504; 528/149; 528/151; 528/161; 428/531
[58] Field of Search ............. 528/161, 151, 132, 149; 525/504; 260/45.8 NT, 45.7 PH, 30.2, 30.8 R

[56] References Cited

U.S. PATENT DOCUMENTS

| | | | |
|---|---|---|---|
| 3,652,561 | 3/1972 | Dexter | 260/248 CS |
| 3,723,156 | 3/1973 | Brockett et al. | 428/531 X |
| 3,819,572 | 6/1974 | Dexter et al. | 260/45.8 NT |
| 3,887,516 | 6/1975 | Song | 260/45.8 NT |
| 3,969,306 | 7/1976 | Borman et al. | 260/45.7 PH |

FOREIGN PATENT DOCUMENTS 8430876 7/1976 Japan.

OTHER PUBLICATIONS

Chem. Abstracts, vol. 86, 1977, 131189s, Tsukamoto et al.–effective date Jul. 23, 1976.

*Primary Examiner*—Howard E. Schain

[57] ABSTRACT

Disclosed is a color-developing composition for pressure-sensitive recording sheet material of the self-contained type comprising (A) 100 parts by weight of a copolymer obtained by reacting a p-alkylphenol having an alkyl moiety of from 1 to 12 carbon atoms and phenol with formaldehyde and (B) from 1 to 20 parts by weight of a hindered phenolic compound selected from phenols having an alkyl, alkylene or hydroxyl substituent radical in at least the 2- or 6-position, or both, of the benzene ring and derivatives thereof, the copolymer and the hindered phenolic compound being homogeneously dissolved in mutual solution. The hindered phenolic compound is either added to the starting materials for the preparation of the copolymer or, at the end of the copolymerization reaction, added to the resulting copolymer and dissolved homogeneously in mutual solution.

14 Claims, No Drawings

COLOR-DEVELOPING PHENOLIC-ALDEHYDE COMPOSITION FOR PRESSURE-SENSITIVE RECORDING SHEET MATERIAL AND PROCESS FOR THE PREPARATION THEREOF

BACKGROUND OF THE INVENTION (a) Field of the Invention

This invention relates to improved color-developing compositions for pressure-sensitive recording sheet material of the single-sheet type.

(b) Description of the Prior Art

Pressure-sensitive recording sheet materials are generally divided into two groups: the double-sheet and the single-sheet type. Pressure-sensitive recording sheet materials of the double-sheet type comprise a first sheet (generally known as "coated back sheet") coated with microcapsules containing an electron donative organic compound (commonly called "pressure-sensitive dye") dissolved in a non-volatile and hydrophobic organic solvent and a second sheet (generally known as "coated front sheet") coated with an aqueous coating composition containing an electron attractive color developer, these sheets being disposed with the coated surfaces thereof facing each other. On the other hand, pressure-sensitive recording sheet materials of the single-sheet type (commonly called "self-contained papers") comprise a single sheet having one surface coated both with a layer of microcapsules and with a layer of color developer.

In the above-described pressure-sensitive recording sheet materials are used one or more pressure-sensitive dyes selected from (1) triphenylmethane dyes such as Crystal Violet Lactone, (2) methylene blue dyes such as Benzoyl Leucomethylene Blue, (3) fluoran dyes such as Rhodamine Lactam, (4) leucoauramine dyes, (5) spiropyran dyes, and the like.

On the other hand, the electron attractive color developers used therein include (1) inorganic solid acids such as acid clay and activated clay, (2) certain phenol-formaldehyde polymers, (3) metallic salts of substituted salicylic acids, and the like. Among these color developers, certain phenol-formaldehyde polymers and particularly p-phenylphenol-formaldehyde polymers are widely used in pressure-sensitive recording sheet materials of the double-sheet type because of (1) their excellent color-developing performance, (2) the good application properties (or rheological properties) of the aqueous coating color prepared therefrom and (3) the good water resistance of the sheets coated therewith.

In the prior art, however, it was quite impractical to use such p-phenylphenol-formaldehyde polymers as the color developer for pressure-sensitive recording sheet material of the single-sheet type because they tend to cause a remarkable degree of backgrounding (or spontaneous color development) during manufacture and/or handling.

The present inventors have previously proposed the use of certain p-alkylphenol-phenol-formaldehyde copolymers as the color developer for pressure-sensitive recording sheet material of the single-sheet type. They are copolymers obtained by reacting one or more p-alkylphenols having the general formula

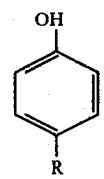

where R is an alkyl radical containing from 1 to 12 carbon atoms, and phenol with formaldehyde in the presence of an acid catalyst, and are now finding wide acceptance.

When used as the color developer for pressure-sensitive sheet material of the single-sheet type, the above-described p-alkylphenol-phenol-formaldehyde copolymers show great advantages such as (1) excellent color-developing performance, (2) good resistance to staining by moist heat (or a low degree of spontaneous color development), and (3) good resistance to yellowing by light. However, these copolymers and self-contained papers fabricated therewith are still liable to yellowing by air oxidation. Thus, there is an eager desire for an improvement which can solve this problem.

SUMMARY OF THE INVENTION

It is an object of the present invention to provide a novel improved color-developing composition for pressure-sensitive recording sheet material of the single-sheet type.

It is another object of the present invention to provide an improved color-developing composition for pressure-sensitive recording sheet material of the single-sheet type which composition is significantly improved in resistance to yellowing during storage and in an oxidizing atmosphere.

It is still another object of the present invention to provide an improved color-developing composition for pressure-sensitive recording sheet material of the single-sheet type which composition has excellent color-developing performance, good resistance to staining by moist heat, and good resistance to yellowing by light.

It has now been discovered that these objects of the present invention are accomplished by a color-developing composition comprising a p-alkylphenol-phenol-formaldehyde copolymer and a phenol having an alkyl, alkylene or hydroxyl substituent radical in at least 2- or 6-position, or both, of the benzene ring (hereinafter referred to as "hindered phenolic compound"), both ingredients being homogeneously dissolved in mutual solution.

DETAILED DESCRIPTION OF THE INVENTION

According to the present invention, there is provided a color-developing composition for pressure-sensitive recording sheet material of the self-contained type comprising (A) 100 parts by weight of a copolymer obtained by reacting at least one p-alkylphenol selected from the group consisting of compounds having the general formula

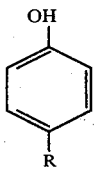

(I)

where R is an alkyl radical containing from 1 to 12 carbon atoms, and phenol with formaldehyde and (B) from 1 to 20 parts by weight of a hindered phenolic compound selected from the group consisting of phenols having an alkyl, alkylene or hydroxyl substituent radical in at least the 2- or 6-position, or both, of the benzene ring and derivatives thereof, the copolymer and the hindered phenolic compound being homogeneously dissolved in mutual solution.

The above-described composition is pulverized and then subjected to wet milling in the presence of a surface active agent. To the resulting aqueous suspension are added various ingredients required to provide the characteristics desired for pressure-sensitive recording sheet materials. The aqueous coating color so prepared is applied on the microcapsule-bearing surface of coated back sheets and then dried to obtain self-contained papers.

The p-alkylphenol used in the present invention may be any of the para-substituted phenols in which the substituent radical is a $C_1$–$C_{12}$ alkyl radical. For example, p-cresol, p-ethylphenol, p-iso-propylphenol, p-sec-butylphenol, p-tert-butylphenol, p-tert-amylphenol, p-cyclohexylphenol, p-sec-hexylphenol, p-n-octylphenol, p-tert-octylphenol, p-nonylphenol, p-tert-dodecylphenol and the like are all usable. However, p-alkylphenols having a $C_4$–$C_{10}$ alkyl radical are preferred. A desired p-alkylphenol-phenol-formaldehyde copolymer can be obtained by mixing one or more such p-alkylphenols with phenol and reacting them with formaldehyde in the presence of a catalyst. Among others, p-tert-octylphenol is most preferred in view of its color-developing performance and particularly its initial color-developing ability. The p-alkylphenol may include small amounts of isomers and homologues which have been produced in the course of its synthesis.

The formaldehyde used in the present invention may be supplied from any of the source materials, such as formalin, paraformaldehyde and the like, which can generate formaldehyde under the reaction conditions. The catalyst used in the present invention may be any of the well-known catalyst for the synthesis of phenol-formaldehyde polymers, such as sulfuric acid, p-toluenesulfonic acid, phosphoric acid, hydrochloric acid, trichloroacetic acid, oxalic acid, sodium hydroxide, ammonia and the like. However, hydrochloric acid and oxalic acid are preferred in view of the color of the resulting copolymer.

In the p-alkylphenol-phenol-formaldehyde copolymers used in the present invention, the molar ratio of the p-alkylphenol to the phenol ranges from 0.3 to 5 and preferably from 0.5 to 3. The molar ratio of the formaldehyde to the combined amount of the p-alkylphenol and the phenol (hereinafter referred to as "F/P ratio") ranges from 0.6 to 1.0. Generally, as the F/P ratio increases, the softening point (as measured according to ASTM E28-58T) of the condensation product is elevated and the color-developing performance thereof is degraded. In the preparation of a particular p-alkylphenol-phenol-formaldehyde copolymer, the F/P ratio should be chosen so that the softening point thereof ranges from 70° to 120° C. and preferably from 80° to 120° C. and most preferably from 90° to 110° C. If the softening point is below 70° C., difficulty will be encountered in pulverizing operation and in the preparation of an aqueous suspension, while if it is above 120° C., the color-developing performance (particularly, the color-developing rate) will be degraded to an impractical level.

The hindered phenolic compounds, which are used in the present invention in order to improve the discoloration behavior of the p-alkylphenol-phenol-formaldehyde copolymer (that is, in order to substantially prevent yellowing thereof) during storage and in an oxidizing atmosphere, include phenols having an alkyl, alkylene or hydroxyl radical or radicals in at least the 2- or 6-position, or both, of the benzene ring and derivatives thereof. Specifically, these hindered phenolic compounds can be classified into three groups: [A] 2,6-di-tert-butylphenol derivatives, [B] di- or triphenol derivatives, and [C] other phenol derivatives.

[A] The 2,6-di-tert-butylphenol derivatives include: (I) unsubstituted, p-alkyl-substituted and p-hydroxyalkyl-substituted phenols such as 2,6-di-tert-butylphenol, 2,6-di-tert-butyl-p-cresol, 2,4,6-tri-tert-butylphenol, 2,6-di-tert-butyl-p-ethylphenol, 3,5-di-tert-butyl-4-hydroxybenzyl alcohol, and the like; (II) 6-(4-hydroxy-3,5-di-tert-butylanilino)-2,4-bis(alkylthio)-1,3,5-triazines such as 6-(4-hydroxy-3,5-di-tert-butylanilino)-2,4-bis-(n-butylthio)-1,3,5-triazine, 6-(4-hydroxy-3,5-di-tert-butylanilino)-2,4-bis(n-octylthio)-1,3,5-triazine, 6-(4-hydroxy-3,5-di-tert-butylanilino)-2,4-bis(tert-octylthio)-1,3,5-triazine, 6-(4-hydroxy-3,5-di-tert-butylanilino)-2,4-bis(n-nonylthio)-1,3,5-triazine, and the like; (III) esters and amides of (3,5-di-tert-butyl-4-hydroxyphenyl)propionic acid such as dodecyl 3-(3,5-di-tert-butyl-4-hydroxyphenyl)propionate, octadecyl 3-(3,5-di-tert-butyl-4-hydroxyphenyl)propionate, 2,2'-thiodiethyl bis [3-(3,5-di-tert-butyl-4-hydroxyphenyl)propionate], 1,6-hexanediol bis-3-(3,5-di-tert-butyl-4-hydroxyphenyl)propionate, N,N'-hexamethylene-bis(3,5-di-tert-butyl-4-hydroxyhydrocinnamamide), pentaerythrityl tetrakis [3-(3,5-di-tert-butyl-4-hydroxyphenyl)propionate], and the like; (IV) di- and triphenols having tert-butyl substituent radicals in both of the 2- and 6-positions of the benzene ring with respect to the phenolic hydroxyl group, such as 2,2'-(3,5-di-tert-butyl-4-hydroxyphenyl)propane, 4,4'-cyclohexylidene-bis(2,6-di-tert-butylphenol), 1,3,5-trimethyl-2,4,6-tris(3,5-di-tert-butyl-4-hydroxybenzyl)benzene, 4,4'-methylene-bis-(2,6-di-tert-butylphenol), 4,4'-thio-bis(2,6-di-tert-butylphenol), and the like; and (V) other 2,6-di-tert-butylphenol derivatives such as 2,6-di-tert-butyl-4-dialkylaminophenols, (3,5-di-tert-butyl-4-hydroxyphenyl)alkyl phosphates, tris(3,5-di-tert-butyl-4-hydroxybenzyl) isocyanurate, and the like.

[B] The di- and triphenol derivatives (excluding the compounds of subgroup [A](IV)) include, for example, 4,4'-thio-bis(3-methyl-6-tert-butylphenol), 2,2'-thio-bis(di-sec-amylphenol), 2,2'-thio-bis(4-methyl-6-tert-butylphenol), 2,2'-thio-bis(4,6-di-tert-butylresorcinol), 4,4'-butylidene-bis(3-methyl-6-tert-butylphenol), 2,2'-methylene-bis(3-methyl-6-tert-butylphenol), 2,2'-methylene-bis(4-ethyl-6-tert-butylphenol), 1,1,3-tris(2-methyl-4-hydroxy-5-tert-butyl)butane, and the like.

[C] The other phenol derivatives include, for example, 3-methyl-6-tert-butylphenol, 2,4-di-tert-butylphenol, 2,5-di-tert-butyl-p-cresol, butylhydroxyanisole, catechol, p-tert-butylcatechol, 4,6-di-tert-butylresorcinol, 4,6-di-tert-amylresorcinol, 2,4-di-tert-butyl-α-naphthol, and the like.

Although these hindered phenolic compounds are all effective in preventing the p-alkylphenol-phenol-formaldehyde copolymer of the present invention from yellowing during storage, the 2,6-di-tert-butylphenol derivatives have been found to be more effective. Among the 2,6-di-tert-butylphenol derivatives, 6-(4-hydroxy-3,5-di-tert-butylanilino)-2,4-bis(alkylthio)-1,3,5-triazines and particularly 6-(4-hydroxy-3,5-di-tert-butylanilino)-2,4-bis(n-octylthio)-1,3,5-triazine as well as esters of (3,5-di-tert-butyl-4-hydroxyphenyl)propionic acid and particularly octadecyl 3-(3,5-di-tert-butyl-4-hydroxyphenyl)propionate are exceptionally effective.

The discoloration behavior of p-alkylphenol-phenol-formaldehyde copolymers and self-contained papers fabricated therewith is presumed to be attributable to the colored products of oxidation reactions caused, during storage, by oxygen or oxidizing agents present in air. However, since the real cause for yellowing cannot be determined in most cases, no effective countermeasures have been taken in the past.

Moreover, the copolymers having phenol radicals in the molecule show a strong tendency to yellowing during storage, as compared with p-alkylphenol-formaldehyde polymers. Furthermore, the tendency becomes much stronger in the pH range (pH 8–9) commonly used for aqueous coating color.

The hindered phenolic compounds used in the present invention are known to be useful as oxidation inhibitors for general-purpose plastics such as polyethylene, polypropylene and polystyrene; synthetic rubbers such as styrene-butadiene rubber, isoprene rubber and ethylene-propylene rubber; polyurethanes; polycarbonates; polyamides; polyacetals; and the like. However, since the hindered phenolic compounds come under the same category as the above-described p-alkylphenol-phenol-formaldehyde copolymers, it has been utterly unknown in the past that these compounds are useful as yellowing inhibitors for phenol-formaldehyde polymers and particularly as yellowing inhibitors for pressure-sensitive recording sheet materials having applied thereto a considerable amount of phenol-formaldehyde polymer in the form of finely-divided particles.

In the fabrication of self-contained papers, a hindered phenolic compound as defined above, together with a p-alkylphenol-phenol-formaldehyde copolymer as defined above, is applied to sheets of paper. There are a number of possible methods of doing this: (1) An aqueous suspension of the p-alkylphenol-phenol-formaldehyde copolymer is prepared and then mixed with a separately prepared aqueous suspension of the hindered phenolic compound to form an aqueous coating color. Alternatively, (2) the hindered phenolic compound is added to the p-alkylphenol-phenol-formaldehyde copolymer and the resulting mixture is suspended in water by wet milling. Alternatively, (3) a resinous composition comprising the p-alkylphenol-phenol-formaldehyde copolymer and the hindered phenolic compound dissolved homogeneously in mutual solution is prepared and then suspended in water.

According to these three methods, self-contained papers containing the same hindered phenolic compound in an equal amount were fabricated and then examined for resistance to yellowing during storage and in an oxidizing atmosphere. As a result, the method (3) has been found to be the most effective in improving resistance to yellowing. The results obtained with the methods (1) and (2) are less desirable than those obtained with the method (3).

Thus, when self-contained papers are fabricated by the combined use of a p-alkylphenol-formaldehyde copolymer and a hindered phenolic compound, a satisfactory improvement in resistance to yellowing is produced not by a mere uniform mixture of finely-divided particles of the p-alkylphenol-phenol-formaldehyde copolymer and finely-divided particles of the hindered phenolic compound, but by finely-divided particles of a composition comprising the p-alkylphenol-phenol-formaldehyde copolymer and the hindered phenolic compound dissolved homogeneously in mutual solution.

The resinous compositions of the present invention, which comprise a p-alkylphenol-phenol-formaldehyde copolymer and a hindered phenolic compound dissolved homogeneously in mutual solution, can be prepared according to the following procedure: p-Alkylphenol and phenol are reacted with formaldehyde or a source material of formaldehyde at a temperature of from 70° to 180° C. for a period of from 1 to 10 hours in the presence of a suitable catalyst. If formalin or paraformaldehyde is used as the source material of formaldehyde or if a small amount of water is added to the reaction system, the reaction temperature can disirably be controlled through the medium of the boiling point (100° C.) of water. After the reaction carried out for a predetermined period of time, the water is removed under normal pressure and then under reduced pressure. On completion of the reaction, the reaction mixture is cooled to obtain a colorless or light-colored and transparent resin.

A hindered phenolic compound is either added to the starting materials for the preparation of the copolymer or, after removal of the water, added to the resulting copolymer. The hindered phenolic compound is used in an amount of from 1 to 20 parts by weight per 100 parts by weight of the p-alkylphenol-phenol-formaldehyde copolymer. If the amount of the hindered phenolic compound is less than 1 part by weight, no sufficient improvement in resistance to yellowing will be produced, while if it is greater than 20 parts by weight, no further improvement in resistance to yellowing will be noted and economical losses will result.

Thus, the color-developing compositions of the present invention, which comprise a p-alkylphenol-phenol-formaldehyde copolymer and a hindered phenolic compound dissolved homogeneously in mutual solution, exhibit improved resistance to yellowing during storage and in an oxidizing atmosphere, in addition to the excellent color-developing performance, good resistance to staining by moist heat, and good resistance to yellowing by light that are possessed by the copolymer.

Accordingly, self-contained papers fabricated with a color-developing composition of the present invention are very excellent in overall characteristics and significantly improved in commercial value.

In order to further illustrate the present invention, the following examples and controls are given. In these examples and controls, the measurement of the softening point of a copolymer, the preparation of an aqueous suspension of a color-developing composition, the preparation of an aqueous coating color, the fabrication of self-contained papers, the determination of the color-developing rate, and the evaluation of resistance to yellowing during storage, to yellowing by $NO_x$, and to staining by moist heat were carried out according to the following procedures.

[Measurement of the Softening Point of a Copolymer]

The softening point of a p-alkylphenol-phenol-formaldehyde copolymer was measured at a heating rate of 5° C./min. according to ASTM E28-58T (Softening Point by Ring and Ball Apparatus).

[Preparation of an Aqueous Suspension of a Color-developing Composition]

A composition comprising a p-alkylphenol-phenol-formaldehyde copolymer and a hindered phenolic compound, or a p-alkylphenol-phenol-formaldehyde copolymer alone, was pulverized. Then, 80 g of the resulting fine powder of 50-mesh size, 6.4 g of a polymeric polycarboxylic acid type surface active agent (comprising a 25% aqueous solution of "Carribon B" manufactured and sold by Kao-Atlas Co., Japan), and 113.6 g of water were mixed in a sand grinding mill to form an aqueous suspension of white particles having an average diameter of $2.0\mu$.

[Preparation of an Aqueous Coating Color]

Using the above-described aqueous suspension, an aqueous coating color was prepared according to the following formulation.

| Ingredient | Amount (parts by weight) | Solid Content (parts by weight) | Notes |
|---|---|---|---|
| Aqueous Suspension | 253 | 106.3 | |
| Kaolin | 545 | 545 | |
| Calcium Carbonate | 100 | 100 | |
| Latex | 130 | 65 | 50% Aqueous Dispersion of Dow 636 |
| Oxidized Starch | 475 | 95 | 20% Aqueous Solution of MS-3600 (manufactured and sold by Nihon Shokuhin Kako Co., Japan) |
| Water | 775.3 | | |
| Total | 2278.3 | 911.3 | |

[Fabrication of Self-contained Papers]

Coated back sheets were prepared by coating sheets of paper (having a basis weight of 40 g/sq.m.) with a layer of microcapsules containing Crystal Violet Lactone. Then, using a Mayer bar, the above-described aqueous coating color was applied to the microcapsule-bearing surface of the coated back papers so as to give a dry-coat weight of 5.5 g/sq.m. Thus, self-contained papers designed to produce a blue color were obtained.

[Determination of the Color-developing Rate]

A self-contained paper fabricated as above was placed between two sheets of quality paper and imprinted with an electrically-operated typewriter to develop a cobalt blue color. The reflectance of the self-contained paper was measured by means of Model TSS Hunter Colorimeter (manufactured and sold by Toyo Seiki Co., Japan) equipped with an amber filter. This measurement of the density of the developed color was made both 1 minute and 20 hours after imprinting. Then, the initial color-developing range ($J_1$) and the ultimate color-developing rate ($J_2$) were calculated from the following equations:

$$J_1 = \frac{I_0 - I_1}{I_0} \times 100 \ (\%)$$

and $$J_2 = \frac{I_0 - I_2}{I_0} \times 100 \ (\%)$$

where $I_0$, $I_1$ and $I_2$ are the reflectances observed before imprinting, 1 minute after imprinting, and 20 hours after imprinting, respectively. With both the initial and the ultimate color-developing rate higher values represent more desirable results.

[Resistance to Yellowing During Storage]

(A) A self-contained paper fabricated as above (but not yet subjected to color development) was stuck on a wall of a room not exposed to direct sunlight and allowed to stand for 2 months. Using Model TSS Hunter Colorimeter equipped with a blue filter, the reflectance of the self-contained paper was measured before and after testing. Then, the degree of yellowing during storage was expressed in terms of the retention of whiteness (Q) defined by the following equation:

$$Q = (M_2/M_1) \times 100 \ (\%)$$

where $M_1$ and $M_2$ are the reflectances observed before and after testing, respectively.

(B) In order to accelerate yellowing during storage and examine the degree of yellowing during storage at elevated temperatures, a self-contained paper fabricated as above was placed in a Geer oven thermostated at 50° C. and allowed to stand for 10 days. Using a blue filter, the reflectance of the self-contained paper was measured before and after testing. Then, the degree of yellowing during storage was expressed in terms of the retention of whiteness (P) defined by the following equation:

$$P = (L_2/L_1) \times 100 \ (\%)$$

where $L_1$ and $L_2$ are the reflectances observed before and after testing, respectively.

In these procedures (A) and (B), greater values for the retention of whiteness (Q) or (P) represent less degrees of yellowing of the coated surface, thus indicating that the quality of the self-contained paper is so high as to retain a high degree of whiteness even after long-term storage under practical conditions.

[Resistance to Yellowing by $NO_x$]

Pressure-sensitive recording sheet materials using a phenol-formaldehyde polymer as color developer are known to undergo yellowing during storage in an oxidizing atmosphere such as $NO_x$. Accordingly, the degree of yellowing in an atmosphere of $NO_x$ (which is a typical oxidant gas) was examined according to JIS-1055 (Procedure for Testing the Fastness of Dyed Materials and Dyestuffs to Nitrogen Oxide Gas). A self-contained paper fabricated as above (but not yet subjected to color development) was placed in a sealed container and exposed to nitrogen oxide gas for 50 minutes. Using a blue filter, the reflectance of the self-contained paper was measured before and after testing. Then, the degree of yellowing by $NO_x$ was expressed in terms of the retention of whiteness (R) defined by the following equation:

$$R = (N_2/N_1) \times 100 \ (\%)$$

where $N_1$ and $N_2$ are the reflectances observed before and after testing, respectively.

Greater values for the retention of whiteness (R) represent less degrees of yellowing in an oxidizing atmosphere such as $NO_x$, thus indicating that yellowing of the self-contained paper is prevented during long-term storage under practical conditions.

[Resistance to Staining by Moist Heat]

A self-contained paper fabricated as above was placed in a chamber kept at a temperature of 40° C. and a relative humidity of 90%, and allowed to stand for 16 hours. Using an amber filter, the reflectance of the self-contained paper was measured before and after testing. Then, the degree of staining by moist heat (or the degree of spontaneous color development under high-temperature and high-humidity conditions) was expressed in terms of the retention of whiteness (T) defined by the following equation:

$$T = (S_2/S_1) \times 100 \, (\%)$$

where $S_1$ and $S_2$ are the reflectances observed before and after testing, respectively.

Greater values for the retention of whiteness (T) represent less degrees of spontaneous color development under high-temperature and high-humidity conditions. If the degree of staining by moist heat is on such a level as shown in the following examples and controls, the problem of spontaneous color development will not arise in case of practical application using an air-knife coater.

EXAMPLE 1

A mixture of 180 g of p-tert-butylphenol, 75.2 g of phenol, 15 g of 6-(4-hydroxy-3,5-di-tert-butylanilino)-2,4-bis(n-butylthio)-1,3,5-triazine, 137.8 g of 37% formalin, and 3.4 g of 15% hydrochloric acid was allowed to condence for 8 hours with water being refluxed. Thereafter, the water was removed by heating the mixture at temperatures up to 170° C. under normal pressure and then under reduced pressure. On completion of the reaction, 290 g of a light-brown and transparent resinous composition having a softening point of 101° C. was obtained.

EXAMPLE 2

A mixture of 180 g of p-tert-butylphenol, 75.2 g of phenol, 20 g of octadecyl 3-(3,5-di-tert-butyl-4-hydroxyphenyl)propionate (manufactured and sold by Ciba-Geigy Co. under the trade name of Irganox 1076), 137.8 g of 37% formalin, and 3.4 g of 15% hydrochloric acid was allowed to condense for 8 hours with water being refluxed. Thereafter, the water was removed by heating the mixture at temperatures up to 170° C. under normal pressure and then under reduced pressure. On completion of the reaction, 295 g of a light-brown and transparent resinous composition having a softening point of 100° C. was obtained.

Control 1

The procedure of Example 1 was repeated except that the octadecyl 3-(3,5-di-tert-butyl-4-hydroxyphenyl)propionate was omitted. As a result, 275 g of a light-brown and transparent p-tert-butylphenol-phenol-formaldehyde copolymer having a softening point of 102° C. was obtained.

EXAMPLE 3

A mixture of 287 g of p-tert-octylphenol, 63 g of phenol, 67.5 g of 80% paraformaldehyde, 17.5 g of 6-(4-hydroxy-3,5-di-tert-butylanilino)-2,4-bis(n-octylthio)-1,3,5-triazine (manufactured and sold by Ciba-Geigy Co. under the trade name of Irganox 565), and 5.0 g of oxalic acid dihydrate was allowed to condense for 10 hours with water being refluxed. Thereafter, the water was removed by heating the mixture at temperatures up to 165° C. under normal pressure and then under reduced pressure. On completion of the reaction, 384 g of a pale-yellow and transparent resinous composition having a softening point of 100° C. was obtained.

EXAMPLE 4

A mixture of 232.5 g of p-tert-octylphenol, 67.5 g of phenol, 134.8 g of 37% formalin, and 4.0 g of 30% hydrochloric acid was allowed to condense for 6 hours with water being refluxed. Thereafter, the water was removed by heating the mixture at temperatures up to 170° C. under normal pressure and then under reduced pressure. Thus, a pale-yellow and transparent resin having a softening point of 102° C. was obtained. The resin was maintained at 150° C. with stirring, during which 20 g of 6-(4-hydroxy-3,5-di-tert-butylanilino)-2,4-bis(n-octylthio)-1,3,5-triazine was added thereto and dissolved therein homogeneously. On cooling to room temperature, 338 g of a pale-yellow and transparent resinous composition having a softening point of 101° C. was obtained.

EXAMPLE 5

The procedure of Example 4 was repeated except that the 6-(4-hydroxy-3,5-di-tert-butylanilino)-2,4-bis(n-octylthio)-1,3,5-triazine was replaced by 20 g of tetrakis[methylene-(3,5-di-tert-butyl-4-hydroxyphenyl)-propionate]methane. As a result, 340 g of a pale-yellow and transparent resinous composition having a softening point of 100° C. was obtained.

Control 2

A mixture of 232.5 g of p-tert-octylphenol, 67.5 g of phenol, 134.8 g of 37% formalin, and 4.0 g of 30% hydrochloric acid was allowed to condense for 6 hours with water being refluxed. Thereafter, the water was removed by heating the mixture at temperatures up to 170° C. under normal pressure and then under reduced pressure. On cooling to room temperature, 318 g of a pale-yellow and transparent p-tert-octylphenol-phenol-formaldehyde copolymer having a softening point of 102° C. was obtained.

TABLE 1

Evaluation of Performance

| | Type of P-Alkyl-phenol-phenol-formaldehyde Copolymer | Type of Hindered Phenolic Compound | Color-developing Rate | | Resistance to Yellowing During Storage | | Resistance to Yellowing by $NO_x$ Retention of Whiteness (R) | Resistance to Staining by Moist Heat Retention of Whiteness (T) |
|---|---|---|---|---|---|---|---|---|
| | | | Initial Value ($J_1$) | Ultimate Value ($J_2$) | Retention of Whiteness (Q) After Storage in a Room for 2 Months | Retention of Whiteness(P) After Storage at 50° C. for 10 Days | | |
| Ex. 1 | p-tert-Butylphenol-phenol-formaldehyde Copolymer | 6-(4-Hydroxy-3,5-di-tert-butylanilino)-2,4-bis(n-butylthio)-1,3,5-triazine | 17.0 | 44.4 | 98.5 | 97.2 | 76.3 | 62.1 |
| Ex. 2 | p-tert-Butylphenol-phenol-formaldehyde Copolymer | Octadecyl 3-(3,5-di-tert-butyl-4-hydroxyphenyl)propionate | 17.0 | 44.3 | 96.2 | 94.1 | 75.2 | 62.0 |
| Control 1 | p-tert-Butylphenol-phenol-formaldehyde Copolymer | Not used | 17.2 | 44.5 | 90.3 | 87.0 | 70.1 | 61.8 |
| Ex. 3 | p-tert-Octylphenol-phenol-formaldehyde Copolymer | 6-(4-Hydroxy-3,5-di-tert-butylanilino)-2,4-bis(n-octylthio)-1,3,5-triazine | 23.0 | 40.6 | 97.4 | 95.2 | 75.2 | 63.0 |
| Ex. 4 | p-tert-Octylphenol-phenol-formaldehyde Copolymer | 6-(4-Hydroxy-3,5-di-tert-butylanilino)-2,4-bis(n-octylthio)-1,3,5-triazine | 22.7 | 40.4 | 97.8 | 96.3 | 74.2 | 62.8 |
| Ex. 5 | p-tert-Octylphenol-phenol-formaldehyde Copolymer | Tetrakis methylene-(3,5-di-tert-butyl-4-hydroxyphenyl)propionate methane | 22.8 | 40.7 | 92.3 | 92.5 | 74.8 | 62.2 |
| Control 2 | p-tert-Octylphenol-phenol-formaldehyde Copolymer | Not used | 23.3 | 40.5 | 89.4 | 86.2 | 69.6 | 63.8 |

EXAMPLE 6

The procedure of Example 4 was repeated except that the 6-(4-hydroxy-3,5-di-tert-butylanilino)-2,4-bis(n-octylthio)-1,3,5-triazine was replaced by 20 g of 4,4'-thio-bis(3-methyl-6-tert-butylphenol). As a result, 340 g of a pale-yellow and transparent resinous composition having a softening point of 100° C. was obtained.

EXAMPLE 7

The procedure of Example 4 was repeated except that the 6-(4-hydroxy-3,5-di-tert-butylanilino)-2,4-bis(n-octylthio)-1,3,5-triazine was replaced by 18 g of 4,6-di-tert-amylresorcinol. As a result, 338 g of a pale-yellow and transparent resinous composition having a softening point of 102° C. was obtained.

EXAMPLE 8

The procedure of Example 4 was repeated except that the 6-(4-hydroxy-3,5-di-tert-butylanilino)-2,4-bis(n-octylthio)-1,3,5-triazine was replaced by 22 g of 2,4,6-tri-tert-butylphenol. As a result, 342 g of a pale-yellow and transparent resinous composition having a softening point of 101° C. was obtained.

Control 3

The procedure of Example 4 was repeated except that the 6-(4-hydroxy-3,5-di-tert-butylanilino)-2,4-bis(n-octylthio)-1,3,5-triazine was replaced by 15 g of N,N'-diphenyl-p-phenylenediamine. As a result, 335 g of a dark-gray and transparent resinous composition was obtained.

TABLE 2

Evaluation of Performance

| | Type of p-Alkyl-phenol-phenol-formaldehyde Copolymer | Type of Hindered Phenolic Compound | Color-developing Rate | | Resistance to Yellowing During Storage | | Resistance to Yellowing by $NO_x$ Retention of Whiteness (R) | Resistance to Staining by Moist Heat Retention of Whiteness (T) |
|---|---|---|---|---|---|---|---|---|
| | | | Initial Value ($J_1$) | Ultimate Value ($J_2$) | Retention of Whiteness (Q) After Storage in a Room for 2 Months | Retention of Whiteness(P) After Storage at 50° C. for 10 Days | | |
| Ex. 6 | p-tert-Octylphenol-phenol-formaldehyde Copolymer | 4,4'-Thio-bis(3-methyl-6-tert-butylphenol) | 22.9 | 40.5 | 91.4 | 89.9 | 71.8 | 62.4 |
| Ex. 7 | p-tert-Octylphenol-phenol-formaldehyde Copolymer | 4,6-Di-tert-amylresorcinol | 23.0 | 40.4 | 90.4 | 90.3 | 73.1 | 62.3 |
| Ex. 8 | p-tert-Octylphenol-phenol-formaldehyde Copolymer | 2,4,6-Tri-tert-butylphenol | 22.8 | 40.6 | 91.9 | 92.8 | 76.5 | 62.5 |
| Control 3 | p-tert-Octylphenol-phenol-formaldehyde Copolymer | N,N'-Diphenyl-p-phenylene-diamine | 20.8 | 39.9 | 70.8 | 68.2 | 69.2 | 60.8 |

What is claimed is:

1. A color-developing composition for pressure-sensitive recording sheet material of the self-contained type comprising (A) a copolymer obtained by reacting at least one p-alkylphenol selected from the group consisting of compounds having the general formula:

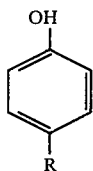   (I)

where R is an alkyl radical containing from 1 to 12 carbon atoms, and phenol with formaldehyde and (B) from 1 to 20 parts by weight, based on 100 parts by weight of (A), of a hindered phenolic compound selected from the group consisting of 6-(4-hydroxy-3,5-di-tert-butylanilino)-2,4-bis(alkylthio)-1,3,5-triazines, the copolymer and the hindered phenolic compound being homogeneously dissolved in mutual solution.

2. The composition of claim 1 wherein R in the general formula (I) is an alkyl radical containing from 4 to 10 carbon atoms.

3. The composition of claim 1 wherein R in the general formula (I) is a tert-octyl radical.

4. The composition of claim 1 wherein R in the general formula (I) is a tert-butyl radical.

5. The composition of claim 1 wherein the molar ratio of the p-alkylphenol to the phenol ranges from 0.3 to 5.

6. The composition of claim 1 wherein the molar ratio ranges from 0.5 to 3.

7. The composition of claim 1 wherein the molar ratio of the formaldehyde to the combined amount of the p-alkylphenol and the phenol ranges from 0.6 to 1.0.

8. The composition of claim 1 wherein the copolymer is obtained by reacting the p-alkylphenol and the phenol with the formaldehyde at a temperature of from 70° to 180° C. in the presence of a catalyst.

9. The composition of claim 1 wherein the copolymer has a softening point of from 70° to 120° C.

10. The composition of claim 1 wherein the copolymer has a softening point of from 90° to 110° C.

11. The composition of claim 1 wherein the 6-(4-hydroxy-3,5-di-tert-butylanilino)-2,4-bis(alkylthio)-1,3,5-triazine is 6-(4-hydroxy-3,5-di-tert-butylanilino)-2,4-bis(n-butylthio)-1,3,5-triazine, 6-(4-hydroxy-3,5-di-tert-butylanilino)-2,4-bis(n-octylthio)-1,3,5-triazine, 6-(4-hydroxy-3,5-di-tert-butylanilino)-2,4-bis(tert-octylthio)-1,3,5-trianine, or 6-(4-hydroxy-3,5-di-tert-butylanilino)-2,4-bis(n-nonylthio)-1,3,5-triazine.

12. The composition of claim 1 wherein the hindered phenolic compound is 6-(4-hydroxy-3,5-di-tert-butylanilino)-2,4-bis(n-octylthio)-1,3,5-triazine.

13. The composition of claim 1 wherein the p-alkylphenol is p-tert-octylphenol and the hindered phenolic compound is 6-(4-hydroxy-3,5-di-tert-butylanilino)-2,4-bis(n-octylthio)-1,3,5-triazine.

14. The composition of claim 1 wherein the hindered phenolic compound is present in an amount of from 2 to 15 parts by weight.